United States Patent [19]
Dietrich, Jr. et al.

[11] Patent Number: 5,457,789
[45] Date of Patent: Oct. 10, 1995

[54] METHOD AND APPARATUS FOR PERFORMING MEMORY PROTECTION OPERATIONS IN A SINGLE INSTRUCTION MULTIPLE DATA SYSTEM

[75] Inventors: Walter C. Dietrich, Jr., Yorktown Heights; Mark A. Lavin, Katonah, both of N.Y.; Hungwen Li, Monte Sereno, Calif.; Ming-Cheng Sheng, Kaoshiung, Taiwan

[73] Assignee: International Business Machines Corporation, Armonk, N.Y.

[21] Appl. No.: 20,870

[22] Filed: Feb. 19, 1993

Related U.S. Application Data

[63] Continuation of Ser. No. 439,758, Nov. 21, 1989, abandoned.

[51] Int. Cl.⁶ .................................................. G06F 12/14
[52] U.S. Cl. ................... 395/427; 395/800; 395/185.05; 364/DIG. 1
[58] Field of Search ...................... 395/425, 375, 395/800

[56] References Cited

U.S. PATENT DOCUMENTS

| | | |
|---|---|---|
| 4,065,808 | 12/1977 | Schomberg et al. . |
| 4,101,960 | 7/1978 | Stokes et al. . |
| 4,229,790 | 10/1980 | Gilliland et al. ......................... 395/800 |
| 4,481,580 | 11/1984 | Martin et al. . |
| 4,484,262 | 11/1984 | Sullivan et al. . |
| 4,523,273 | 6/1985 | Adams, III et al. . |
| 4,569,052 | 2/1986 | Cohn et al. . |
| 4,574,348 | 3/1986 | Scallon . |
| 4,601,055 | 7/1986 | Kent . |
| 4,621,339 | 11/1986 | Wagner et al. . |
| 4,636,942 | 1/1987 | Chen et al. . |
| 4,665,556 | 5/1987 | Fukushima et al. . |
| 4,707,781 | 11/1987 | Sullivan et al. . |
| 4,709,327 | 11/1987 | Hillis et al. . |
| 4,727,474 | 2/1988 | Batcher . |
| 4,773,038 | 9/1988 | Hillis et al. . |
| 4,823,281 | 4/1989 | Evangelisti et al. ...................... 395/135 |
| 4,825,359 | 4/1989 | Ohkami et al. .......................... 395/800 |
| 4,873,630 | 10/1989 | Rusterholz et al. ..................... 395/800 |
| 4,891,787 | 1/1990 | Gifford ..................................... 395/800 |
| 5,038,282 | 8/1991 | Gilbert et al. ........................... 395/800 |
| 5,325,324 | 6/1994 | Rentzepis et al. ....................... 365/127 |

FOREIGN PATENT DOCUMENTS

| | | |
|---|---|---|
| 2327594 | 5/1977 | France . |
| 8101341 | 5/1981 | WIPO . |

OTHER PUBLICATIONS

S. Mazor and S. Wharton "Promote User Privacy Through Secure Memory Areas" Computer Design vol. 21, No. 10, pp. 89, 90 and 92 (Oct. 1982).

A. J. Sutton and K. G. Tan, "Processor Sharing and Partitioning of Main Storage in the MP System" IBM Technical Disclosure Bulletin vol. 22, No. 5, pp. 2009–2010 (Oct. 1979).

(List continued on next page.)

*Primary Examiner*—William M. Treat
*Attorney, Agent, or Firm*—Ratner & Prestia

[57] ABSTRACT

In a multiprocessor system, memory accesses by the individual processing elements are checked by a common controller. The controller includes a table of values defining valid memory locations for a task. The controller verifies the address value used by each instruction to ensure that, it is within a valid memory area for the particular task. Additional circuitry for the controller and processing elements allows finer control, of memory accessibility. The multiprocessor system may be coupled to a host computer through a buffer. Data is serially written into the buffer by the host and is read out of the buffer in parallel by the multiprocessor system. The buffer used in this system includes apparatus which calculates an error correction code from a serial data stream and passes this code, along with the data, to the multiprocessor system. The multiprocessor system includes apparatus which processes the data in parallel to handle errors occurring during transfers as indicated by the code.

18 Claims, 8 Drawing Sheets

OTHER PUBLICATIONS

D. Halton, "Hardware of the System 250 for Communication Control" IEEE International Switching Symposium Record, pp. 530–536 (Jun. 6, 1972).

Li et al., Polymorphic–Torus Network, 1987.

Kenneth E. Batcher, Massively Parallel Processor, MIT Press 1985, pp. 191–204.

B. Lindskog—Per–Erik Danielsson, PICAP3, A Parallel Processor Tuned For 3DIMAGE.

METHOD AND APPARATUS FOR PERFORMING MEMORY PROTECTION OPERATIONS IN A SINGLE INSTRUCTION MULTIPLE DATA SYSTEM

This application is a continuation of application Ser. No. 07/439758 filed Nov. 21, 1989, now abandoned.

FIELD OF THE INVENTION

The present invention relates generally to multiprocessor parallel computing systems and particularly to methods and apparatus for maintaining the integrity of data processed by such systems.

BACKGROUND OF THE INVENTION

Multiprocessor parallel computing systems have recently become available which may be coupled to a host computer to enhance its performance. Generally, an attached parallel processing system of this type has a relatively limited instruction set. It is designed to perform simple, repetitive operations in parallel and, so, reduce the elapsed time for processing a program. A system of this type is generally coupled to a communications bus of the host computer and is treated as an input/output (I/O) device.

The most common types of attached multiprocessor systems are the Multiple-Instruction Multiple Data (MIMD) systems and the Single-Instruction Multiple Data (SIMD) systems. An MIMD system is a conventional multiprocessor system where each processor may execute a separate program operating on a separate data set. The processors in a system of this type may perform separate tasks or they may each perform a different sub-task of a common main task.

In an SIMD system, each processor may have a different set of data in its associated memory, but all processors are governed by a common controller, and perform the same operations on each of the different data sets. Processors of this type may be used, for example, for simulation programs in which the effects of a stimulus on a set of points spanning an area or a volume are calculated simultaneously.

When either of these two types of systems is coupled to a host computer, instructions and data are transferred between the multiprocessor system and the host computer via a communications bus.

Many computer systems include apparatus which continually checks the validity of the data being processed. This apparatus ranges from parity checking circuitry to circuitry which inserts and analyzes error correcting codes (ECC's). Although apparatus of this type may be used to maintain data integrity separately in the host computer and in the multiprocessor system, it may be difficult to verify the integrity of data transferred between the two systems.

To illustrate how these problems may occur, consider an exemplary multiprocessor system, the Polymorphic-Torus network, which is described in a paper by H. Li et al. entitled "Polymorphic-Torus Network" Proc. Int. Conference on Parallel Processing, PP 411–414, 1987, hereby incorporated by reference. This system is an SIMD processor network in which $N^2$ bit-serial processors are arranged in an N×N matrix. Assuming the host computer uses K-bit words in its data processing, data values are transferred to the multiprocessor system in groups of $N^2$ K-bit words. In a typical application, these data values may be stored into a buffer as $N^2$ K-bit words and may be shifted out of the buffer into the $N^2$ bit-serial processors as K $N^2$-bit words. Any ECC incorporated in the K-bit words generated by the host would be difficult to use in the attached multiprocessors. Similarly, any ECC developed by the multiprocessors would be difficult to use in the host processor.

An SIMD multiprocessor system may be used in a multiprogramming environment, that is to say, the system may run multiple programs on a time-slice basis. For example, when a program running on the multiprocessor system enters a wait state, e.g. to perform an I/O operation, another program may be activated to run on the system. When this second program enters a wait state, the first program is reactivated. Operating the system in this manner is generally more efficient than restricting it to execute each program to completion before starting the next program. However, there is a potential for data corruption if one program is allowed access to data locations used by another program while the other program is inactive.

U.S. Pat. No. 4,773,038 to Hillis et al. relates to an SIMD system in which each memory associated with one of the processing elements may be subdivided. Each processing element operates on the contents of each subdivision sequentially to simulate a greater number of processors.

U.S. Pat. No. 4,727,474 to Batcher relates to a multiprocessor system which has a staging memory system that includes error detection and correction apparatus for data used by the multiprocessor system.

U.S. Pat. No. 4,636,942 to Chen et al. relates to a computer system that has multiple independent processors. The system includes a set of shared registers which are used to coordinate access to resources that are common to all of the processors.

U.S. Pat. No. 4,569,052 to Cohn et al. relates to apparatus for protecting computer memory which uses a parity matrix to generate an error correcting code.

U.S. Pat. No. 4,523,273 to Adams, III et al. relates to a multistage data routing system which includes error correction and error detection apparatus.

U.S. Pat. No. 4,299,790 to Gilliand et al. relates to a MIMD system which includes apparatus for checking memory accesses against base and length parameters for a task. If an attempted access is found to be out of range, the task is suspended. Data transfers between asynchronous tasks are facilitated by semaphores implemented in hardware.

U.S. Pat. No. 4,101,960 to Stokes et al. relates to an SIMD computer system which includes apparatus that contains bounds and descriptions of vectors defined in a memory space. Memory access errors may be checked by this apparatus to provide early detection of errors in vector processing.

SUMMARY OF THE INVENTION

The present invention is embodied in a multiprocessor system in which memory accesses by individual processing elements are checked by a common controller. The controller includes a table of values defining valid memory locations for a task. The controller verifies the address value used by each instruction to ensure that it is within a valid memory area of the task.

In another aspect of the invention, the multiprocessor system is coupled to a host computer through a buffer. Data are serially written into the buffer by the host and are read out of the buffer in parallel by the multiprocessor system. The buffer used in this system includes apparatus which calculates an error correction code (ECC) from a serial data stream and passes this code, along with the data, to the multiprocessor system. The multiprocessor system includes apparatus which processes the data in parallel to handle errors indicated by the ECC.

DETAILED DESCRIPTION

Figure 1:
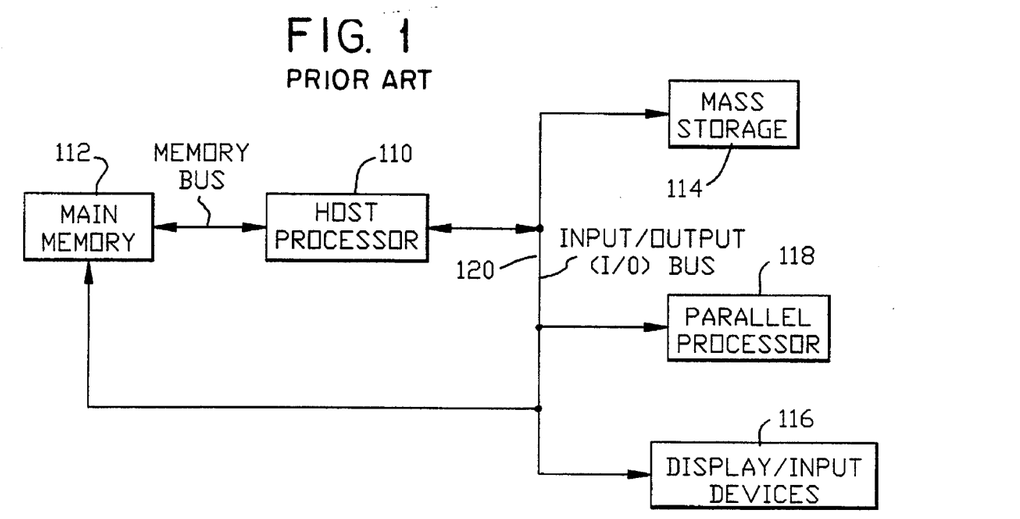
FIG. 1 (Prior art) is a block diagram of a computer system which includes a parallel processor.

FIG. 1 is a block diagram of a computer system which includes an attached multiprocessor system. The computer system includes a host processor 110 which is coupled to a main memory 112 via a memory bus MB. The processor 110 is further coupled to peripheral devices via an I/O bus 120. The peripheral devices may include, for example, a mass storage device 114, such as a disk drive, and an operator display terminal which may include a cathode ray tube (CRT) display device and a keyboard input device 116. In this embodiment of the invention, a parallel processor 118 is coupled to the I/O bus 120 as a peripheral device.

Figure 2:
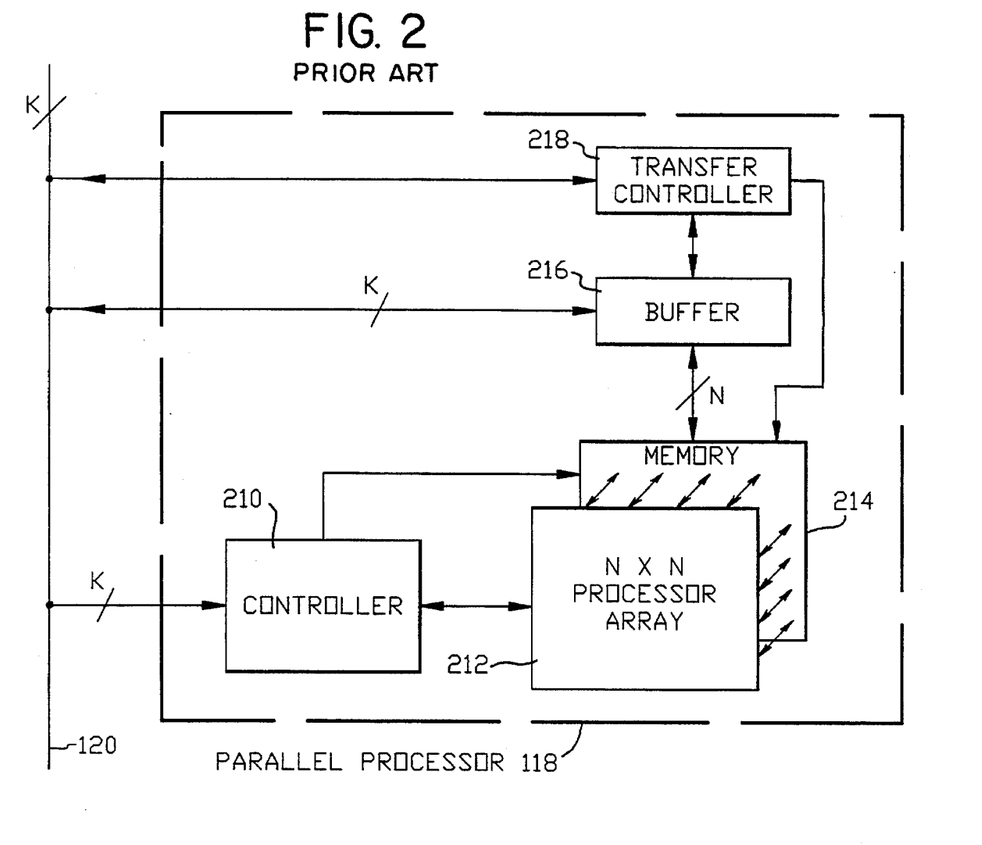
FIG. 2 (Prior art) is a block diagram of a parallel processor suitable for use in the computer system shown in FIG. 1.

FIG. 2 is a block diagram of an exemplary parallel processor 118. The processor shown in FIG. 2 includes a controller 210 which is coupled to the I/O bus 120 to receive commands from the host processor 110. These commands determine the processing steps performed by an N by N processor array 212 on data values stored in a memory 214. Data transfers between the host processor 110 and the memory 214 are accomplished using a transfer controller 218 and an $N^2$ by K-bit buffer 216.

In normal operation, the host processor 110 supplies data for each of the $N^2$ processors 212 to the bus 120 as blocks of $N^2$ K-bit words. Each block is loaded into the buffer 216 by the transfer controller 218 which is controlled by a program provided by the host processor 110 via the bus 120. As each block is loaded, it is transferred into the memory 214 under control of the transfer controller 218. When the data values have been provided, the host processor 110 loads a program for the parallel processors 212 into the controller 210. The Controller 210 then sends a copy of each program instruction encountered during program sequencing to each processing element within the N×N Processor Array 212.

Figure 2A:
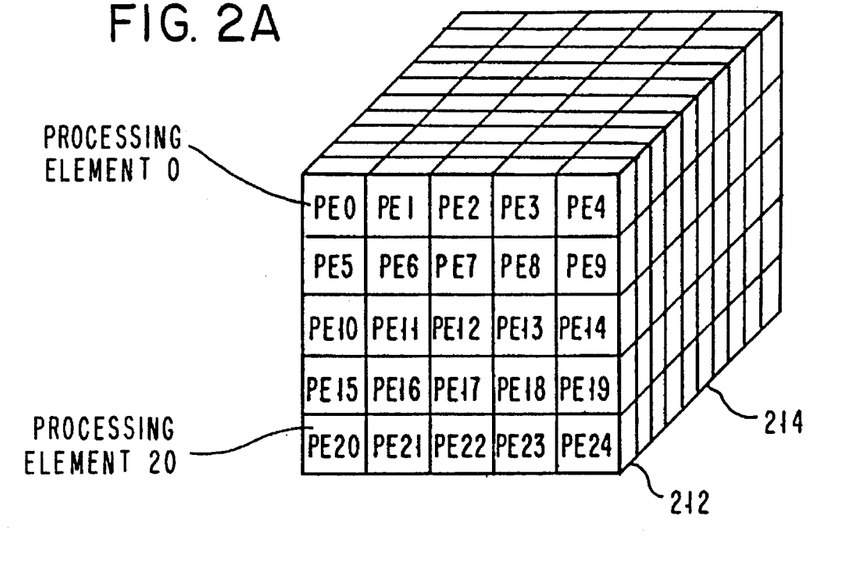
FIG. 2A is a diagram that is useful for explaining the structure of the parallel processor system shown in FIG. 2.

FIG. 2A is a representation of an exemplary N×N Processor Array 212 with its associated memory 214. While this figure shows a representation of specific dimensions, it is contemplated that the actual size of the structure can be increased or decreased as necessary to suit individual applications. The blocks shown in the foreground plane of this figure represent individual processing elements 212. The remaining blocks shown in this FIG. 214 represent individual memory elements. In the system shown in FIGS. 2 and 2A, a processing element is capable of directly accessing any memory elements directly behind itself.

In this system, a first processing element is also capable of accessing data in a memory location behind a second processing element. However, such access is only possible indirectly. For a first processor to retrieve data from a memory element behind a second processor, the second processor retrieves the data and transfers it to the first processor. For the first processor to store data in a memory element behind the second processor, the first processor transfers the data to the second processor and the second processor performs the actual storage operation.

Each N×N plane of memory parallel to the processor plane is referred to as a memory plane. Access to a specific memory element is a function of the memory plane in which the memory element resides and the processing element which is directly in front of the memory element and, hence, can access it directly. Thus, a memory location is specified by the combination of a processing element number, a memory plane number and, optionally, an address within a set of memory elements having a common processing element number and memory plane number. In the embodiments of the invention described below, the processing elements are bit-serial devices and the memory planes are bit-planes. Consequently, each bit in the memory 214 may be uniquely identified by a processing element number and a bit-plane number.

All processors in the N×N Processor Array execute the same instruction simultaneously. However, each processor manipulates data within a separate memory partition. Thus, the data manipulated by the various processors may be different.

In this embodiment of the invention, a first, currently-running process may enter a waiting state or be preempted by second process at any time. If a second set of instructions, relating to the second process, is sent before a first process has completed execution in the N×N Processor Array, it is desirable to preserve a part of the current state of the computer so that execution of the first process can resume at a later time.

It is possible, that the instructions for the second process may write information into a memory location that is still being used by the first process. In this way, data which may be used by the first process can become corrupted.

This invention acts to restrict the memory locations that may be accessed by the second process or any other process. In this way, the corruption of data belonging to first processes may be avoided.

In addition, the present invention verifies that an address is valid for an instruction in a particular process before the instruction is executed. If the address is invalid, then the current process is suspended and an interrupt is sent to an operating system.

Figure 4:
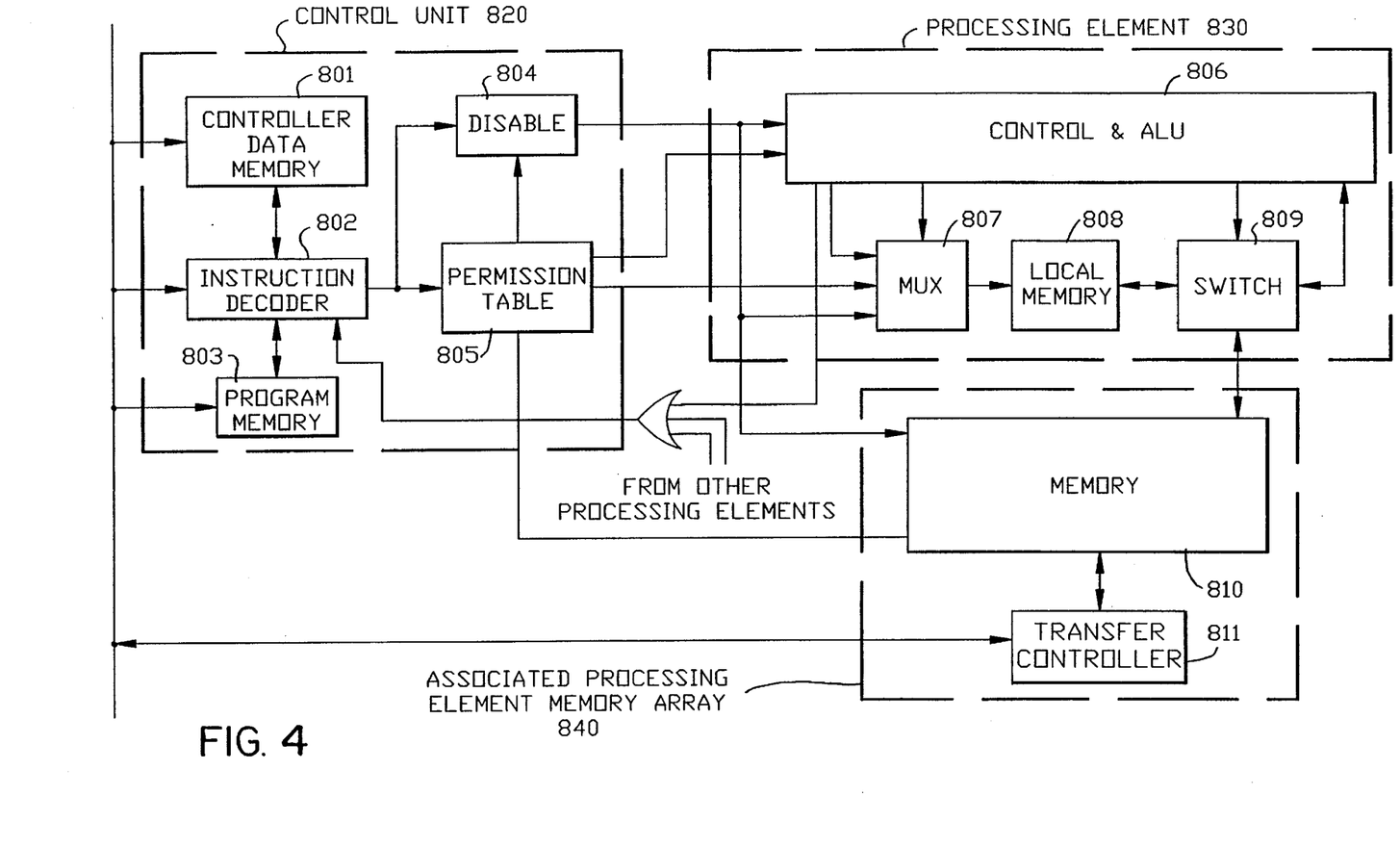
FIG. 4 is a block diagram which is useful for describing the interface between the processing elements and the controller of a parallel processor system in accordance with the present invention.

FIG. 4 shows exemplary circuits which determine the validity of an instruction/address pair. In FIG. 4, a single processing element 830 is shown. In a preferred embodiment of the disclosed invention, many processing elements 830 will exist. Each processing element 830 is coupled to an associated processing element memory array 840. The processing element accesses data from its associated processing element memory array via a switch 809.

The instruction decoder 802 determines whether the instruction/address pair which has just been read from program memory 803 will read or write memory 840, associated with the processing element 830. This information is then sent to a permission table 805.

The permission table 805 determines whether a read or a write access is allowed at a specified address. There are several schemes that can be used to make this determination. These schemes may include:

registers indicating upper and lower limits of a contiguous storage area;

registers containing the size of a memory area;

bits that indicate whether a particular section of memory may be accessed;

identification keys associated with particular sections of memory;

one table of access rights for each process, each table being loaded into special registers immediately before the process starts running.

Figure 3:
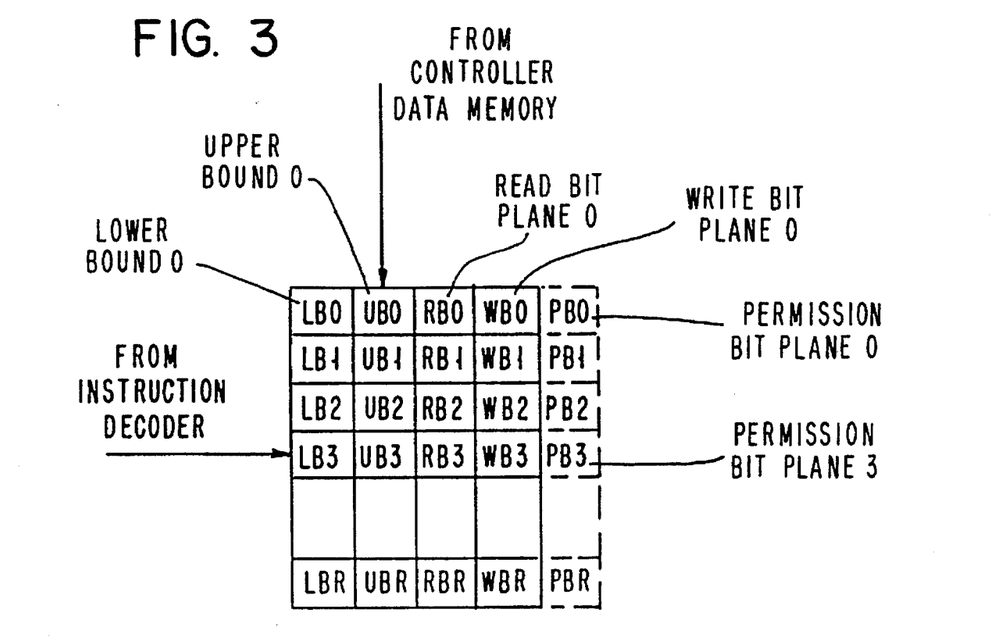
FIG. 3 is a data structure diagram which illustrates an internal table maintained by the a parallel processor controller which includes an embodiment of the present invention.
Figure 5:
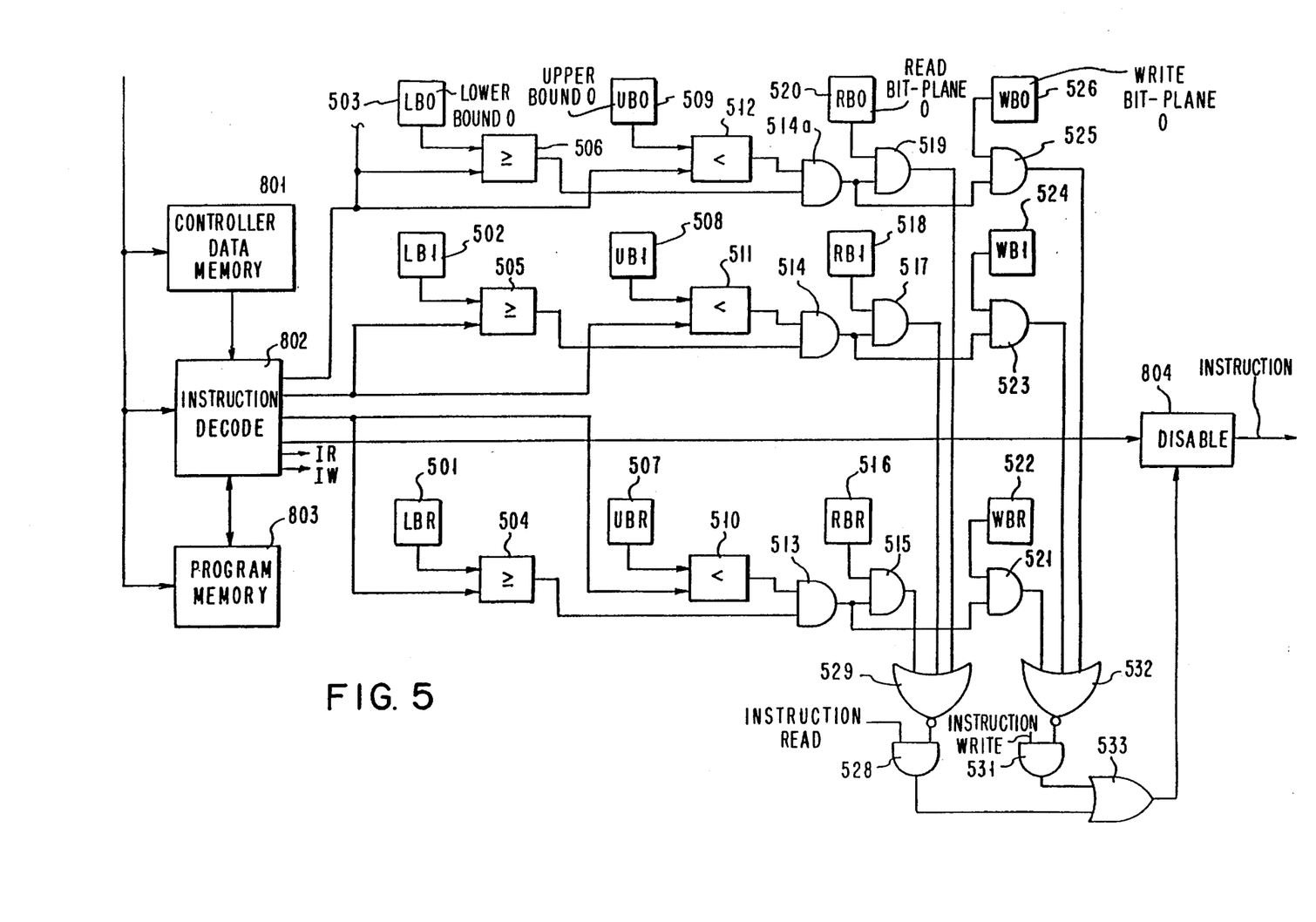
FIG. 5 is a block diagram of a portion of an exemplary controller for a parallel processor system which includes an embodiment of the present invention.
Figure 6:
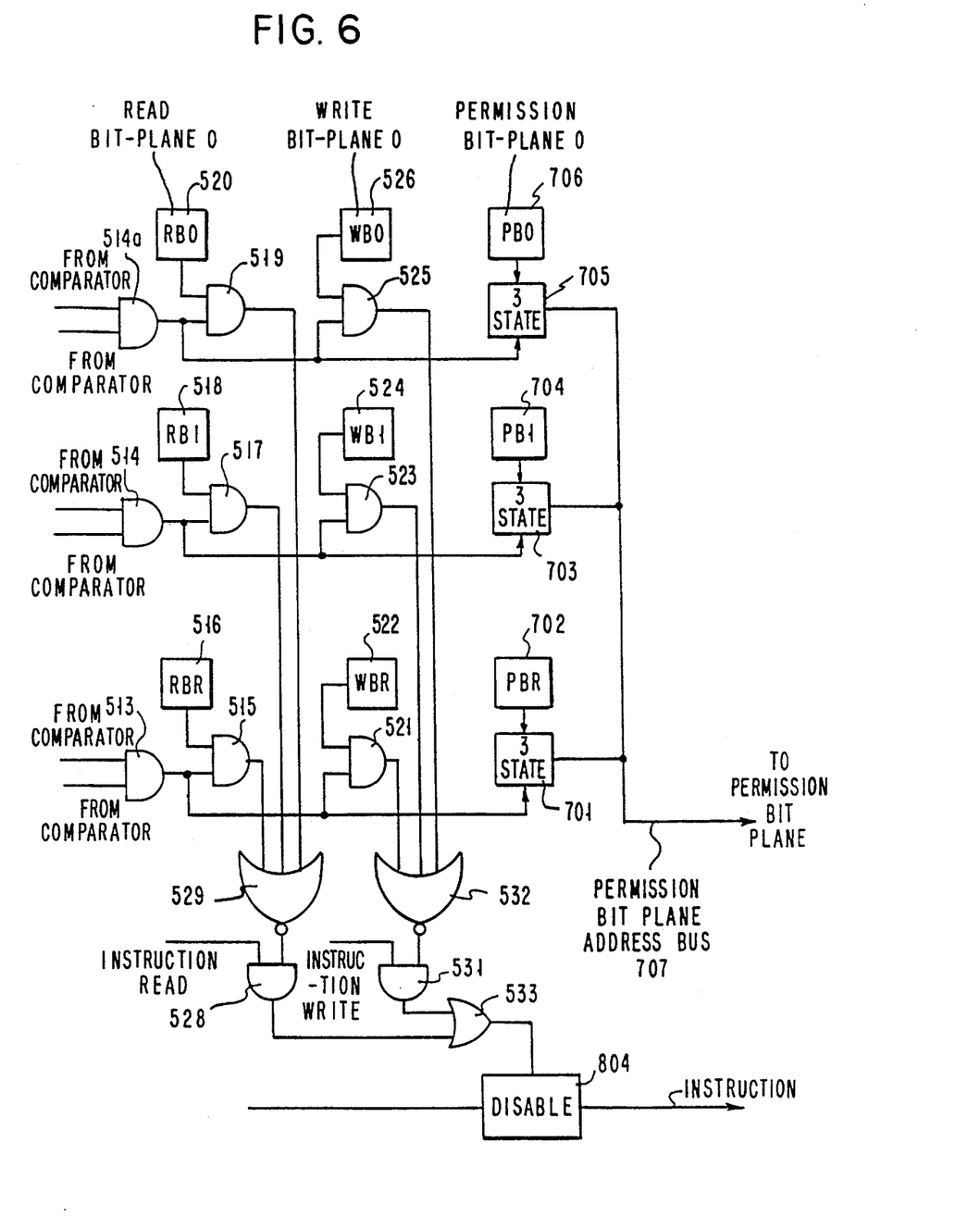
FIG. 6 is a block diagram which illustrates an extension of the controller apparatus shown in FIG. 5.

In FIG. 3 an exemplary permission table is shown. The table is organized such that the rows correspond to respectively different section of memory and the columns correspond to respectively different parameters of a process. In the exemplary embodiments of the invention, each row may be assigned to a respectively different process or multiple rows may be grouped and the groups assigned to respectively different processes. It is understood that any scheme for determining the allowablity of a memory access may be used. In FIGS. 3, 5 and 6, the exemplary permission tables include R+1 rows, corresponding to R+1 sections of memory. In general, there may be any number of memory sections, although any number beyond the total number of memory planes is redundant.

In the exemplary permission table, five columns are shown: LB, UB, RB, WB and PB. The LB column indicates a lower boundary of memory which can be accessed in the section of memory process associated with the row. The UB column indicates an upper boundary of memory that can be accessed in the section of memory associated with the row. The RB and WB columns respectively, indicate read and write protection for the section of memory specified by the LB and UB entries.

The PB column is optionally used to restrict access to finer areas of memory. This column refers to a plane of memory called the permission bit plane. Before a memory access may occur at a memory location, denoted by processing element address and bit plane address, a value which has been placed in a corresponding location of the permission bit plane is evaluated. This corresponding location is called a permission bit plane location. If the permission bit plane location corresponding to a particular processing element contains a predetermined value, then that processing element will be allowed to access the memory location specified by the instruction subject to the read and write constraints of the RB and WB columns. As a special case, the permission bit planes may be ignored if the permission bit plane address, in the PB column of the permission table 805, is set to a pre-determined constant.

If more flexibility is desired in the allocation of memory, the permission table may include multiple rows for each process. In this scheme, the permission table is reloaded before the start or resumption of each process and the table only contains the entries for that process. The lower and upper bound registers, LB and UB, and the read and write bits, RB and WB are used to ascertain which row of the table is used to determine whether a given memory access is allowed.

The contents of the permission table may be obtained from the host 110 or the data memory 801 of the control unit 820.

The permission bit plane address is stored in permission table 805 as previously discussed. If a permission bit plane is used then the referenced permission bit plane address is transferred, via multiplexer 807, to a control and arithmetic unit (CAU) 806 located in the processing unit 830. The CAU 806 uses the data stored in the local memory 808 at the permission bit plane address to determine whether access to a specific memory location is allowed.

If, according to the permission table 805, a bit plane access is not allowed for a specific process, the permission table 805 notifies the disable unit 804, which, in turn, signals the CAU 806 to inhibit this access.

In FIG. 5, circuitry representing a logical implementation of the permission table of FIG. 3 is shown. The optional permission bit plane circuitry is not shown in this FIGURE. The circuit of FIG. 5 compares the address of a memory access with addresses stored in the permission table. This circuit also determines whether read and write operations are allowed at a specified address. When a memory access instruction is transmitted from the instruction decoder 802 to the permission table 805, a comparator 504 determines whether the location of this memory access is greater than or equal to a bit plane which is designated in lower bound register 501. This register corresponds to the lower bound value LBR shown in FIG. 3.

The location of this memory access is also evaluated by a comparator 510. Comparator 510 determines whether the location of the memory access is less than a bit plane which is designated in upper bound register 507.

The output terminals of comparator 504 and comparator 510 are coupled to the input terminals of an AND gate 513. If the referenced memory location is within the bounds designated by the lower bit plane register 501 and the upper bit plane register 507, a logical true value will appear on the output terminal of the AND gate 513. This signal is applied to respective input terminals of AND gates 515 and 521. If a memory read operation is allowed as a result of the value stored in read bit register 516, a logical true value will appear on the output terminal of AND gate 515, causing a logical false value to appear on the output terminal of NOR gate 529. Similarly, if a memory write is allowed by virtue of values stored in write bit register 522, a logical true value will appear on the output terminal of AND gate 521, causing a false logic value to appear to on the output terminal of NOR gate 532.

The signals IR and IW are provided by the instruction decoder. These signals indicate whether the instruction reads or writes data, respectively. If an instruction reads data and gate 529 indicates that a read is impermissible, a logical true value will appear on the output of gates 527 and 529. This value causes a logical true value to appear on the output of AND gate 528. If an instruction writes data and the gate 532 indicates that a write is impermissible, then a logical true value will appear on the output of gates 530 and 532. This causes a logical true value to appear on the output of AND gate 531. The signals provided by the or gates 528 and 531 are applied to the OR gate 533 and condition it to provide a logical true level at its output terminal. This value is applied to the input terminal of disable unit 804 to block execution of the instruction performing the impermissible memory access.

FIG. 6 shows exemplary circuitry which implements a protection scheme that includes permission bit-plane masking. By using permission bit-plane masking, instruction access may be restricted to finer areas of memory (i.e., less than a bit plane). This is useful in systems where multiple users share a SIMD computer memory. In addition, bits in a permission bit plane may be used to reserve selected areas of memory as a system resource or to prevent access to defective memory cells. Permission bits can also be used for debugging by showing where programs are reading or writing data at improper memory locations.

The logic circuitry shown in FIG. 6 which is associated with the lower bound registers, LB0 through LBR, upper bound registers, UB0 through UBR, read bit-plane registers, RB0 through RBR and write bit registers WB0 through WBR is identical to the corresponding circuitry shown in FIG. 5. Three additional three-state gates, 701, 703 and 705, three permission bit-plane registers 702, 704 and 706 and a permission bit plane address bus 707 are added in FIG. 6.

In the example set forth above, the contents of the permission bit-plane register corresponding to the selected contiguous storage area is detected by the circuitry in FIG. 5 that includes the lower and upper bound registers and their associated comparators. This value is placed on the permission bit-plane address bus 707. It is noted that the various address ranges specified by the lower and upper bit-plane registers are desirably disjoint, or meaningless values may be placed on the permission bit-plane address bus 707.

In one embodiment of the disclosed invention, the value on the permission bit plane address bus 707 is interpreted as the address of a bit-plane in the memory 840. This addressed bit-plane contains permission bits that indicate which of the processing elements 830 are allowed to access their associated memory arrays during the execution of the instruction. If the contents of the permission bit-plane for a particular processing element is a first specified value (e.g. 0), then access to the corresponding memory location by that processing element is inhibited. Otherwise, access is allowed. If subsequent decoding of the instruction indicates that a memory operation is to take place, this condition is detected and an interrupt is forwarded to the control unit to indicate an attempt was made to access an invalid memory location for the processing element.

In an alternate embodiment of the invention, the scheme described above is extended so that, if a particular address value (e.g. 0) appears on the permission bit-plane address bus 707, then the reading and checking of the permission bit-plane may be skipped for the instructions being executed. This may be desirable as a means to shorten the instruction cycle time in cases where the finer degrees of protection provided by the permission bit-plane scheme are not desired.

In another alternative embodiment of the invention, the above schemes are modified so that the permission bit plane resides in a memory bit-plane having an address that is either a fixed value or a value designated by a register in the control unit 820. In this instance it is only necessary that the bit-plane registers 702, 704 and 706 and the permission bit-plane address bus convey a single bit of information, indicating whether the permission bit-plane should be accessed.

In yet another alternative embodiment, the first two schemes described above are modified so that the permission bit plane occupies a set of registers 808, one set per processing element. In this instance, it may be possible to read, test and act on the permission bits more quickly than if they are stored as a part of the processing element memory array 840. For this embodiment of the invention, the permission bit-plane address bus 707 conveys only a single-bit of information: whether the permission bit-plane registers 808 are to be used for the instruction.

In still another alternative embodiment, the preceding scheme is extended to a set of multiple-bit registers 808 holding the contents of multiple permission bit planes. Permission bit plane address bus 707 selects one of the permission bit planes. A particular address value (e.g. 0) is used as in other schemes above to disable checking.

SIMD computer systems may be used in conjunction with Von Neumann type computers for programming ease. Instructions are entered into the Von Neumann type computer (called the host) and are then transferred to the SIMD computer, where they are executed by several processors simultaneously. An example of this configuration is shown in FIG. 2.

The SIMD system described above may often participate in data transfers between itself and a host computer as shown in FIG. 2. While an SIMD system and a host system may each have their own error correction, schemes neither system can verify the integrity of data transferred between the two.

Figure 7:
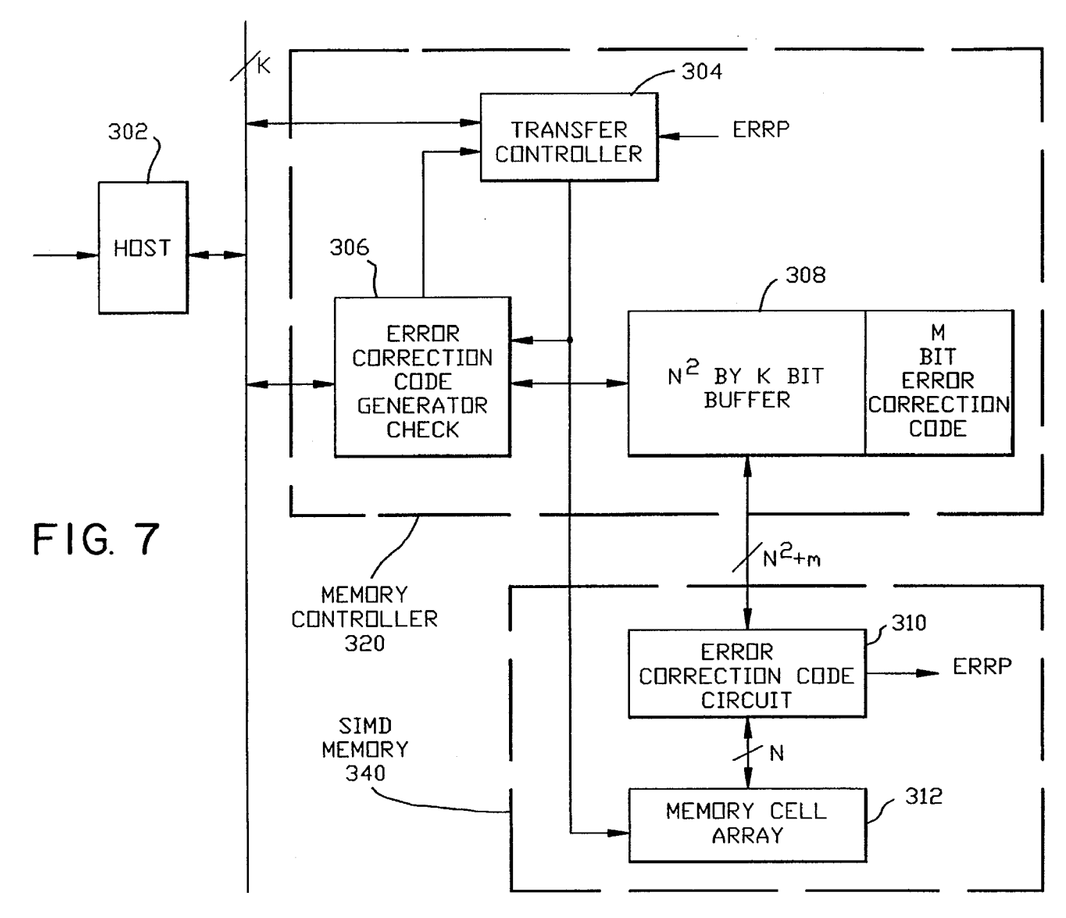
FIG. 7 is a block diagram of an error correction system suitable for use in a parallel processor system which includes an embodiment of the present invention.

FIG. 7 is a block diagram of an error correction system suitable for use in the parallel processor system shown in FIG. 2. This error correction system facilitates the transfer of data between the host 302 and the memory cell array 312. The host 302 interfaces with a buffer 308 between itself and the SIMD system via an I/O channel. The I/O channel is K-bits wide. However, the SIMD system includes $N^2$ processors where $N^2$ may not be equal to K. The buffer 308 is $N^2 \times K$ bits and is used as an intermediary form of storage between the host 302 and the memory cell array 312. This $N^2$ by K-bit buffer 308 is accessed by the host 302 as a K-bit entity for each access. The K-bit entity is referred to as a word. The memory cell array 312 accesses the $N^2$ by K-bit buffer 308 as an $N^2$-bit entity for each access. The $N^2$-bit access entity corresponds to a bit-plane.

The buffer 308 is organized as a two-dimensional, structure because the memory organization for the host system and the SIMD system are different. At the host end, data is organized as a K-bit word and $N^2$ units of data are passed sequentially via the I/O channel. These $N^2$ data values, however, are distributed in bit-serial form to $N^2$ SIMD processors and are organized in K consecutive memory bit locations in each processor.

As a result of the two dimensional organization of the buffer 308 used in the exemplary system, each SIMD access to the buffer 308 involves one bit of each of the $N^2$ K-bit words. Conversely, each access by the host 302 involves only one K-bit word.

Because the buffer 308 "corner turns" the transferred data, current error correction codes and schemes are not applicable. Error correction codes in this case are not meaningful because only partial information required by the error correcting code scheme is made available at each bit-plane access. For the same reason, the error correcting code for the bit-plane is not meaningful because only one bit out of M bits of the error correction information is available in any one access. Thus, the buffer which exists between the host and the SIMD system is unprotected. Data may be unknowingly corrupted due to a failure of the buffer, regardless of error protection at both the host and the SIMD unit.

In this embodiment of the invention data integrity is preserved through the use of an error correction code (ECC). Data transfers between the host 302 and the $N^2$ by K-bit buffer 308 occur through an ECC generator check circuit 306. Data transfers between the memory cell array 312 and the $N^2$ by K-bit buffer 308 occur through an ECC circuit 310. In actual practice, the ECC circuit 310 may reside with the memory cell array 312 to form a memory board 330. A transfer controller 304 controls the operation of the ECC generator and check circuit 306 and the ECC circuit 310.

The following definitions are useful for understanding the operation of the error correction code circuitry:

ECC(i)—One of i error correction code circuits.

C(i)—A bit i of an error correction code word.

B(W) (i)—An i-th bit of a word W received from the host 312 via the I/O channel.

By using a rule R, an ECC(i) can be generated for a B(W)(i) of W words. The rule R can be any error correction code. An exemplary rule R for W words of length 16 bits follows. For this example, the W of B(W)(i) is constant and is hence deleted, CX is the check bit. A rule R to generate the error correction code bits which is well known in the field of error correction is a modified Hamming code and is as follows:

CX=B1 xor B2 xor B3 xor B5 xor B8 xor B9 xor B11 xor B14

C0=B0 xor B1 xor B2 xor B4 xor B6 xor B8 xor B10 xor B12

C1=B0 xor B3 xor B4 xor B7 xor B9 xor B10 xor B13 xor B15 xor 1

C2=B0 xor B1 xor B5 xor B6 xor B7 xor B11 xor B12 xor B13 xor 1

C4=B2 xor B3 xor B4 xor B5 xor B6 xor B7 xor B14 xor B15

C8=B8 xor B9 xor B10 xor B11 xor B12 xor B13 xor B14 xor B15

The relation between the error correction code bits C and the data bits B is summarized in Table 1.

are stored in an extra memory dedicated to the ECC. For the data written by SIMD system, the rule R, to generate output code bits, can be implemented by a commercial ECC part (e.g. AMD2960/2960A manufactured by Advanced Micro Devices) because the N×N bits of input data are simultaneously available to the ECC generation circuitry.

By contrast, the data to generate the equivalent ECC for writing the buffer from the host side is available sequentially. As a result, the ECC code bits should be generated by evaluating the rule R sequentially. A new circuit is provided for the two-dimensional buffer protection.

Figure 8:
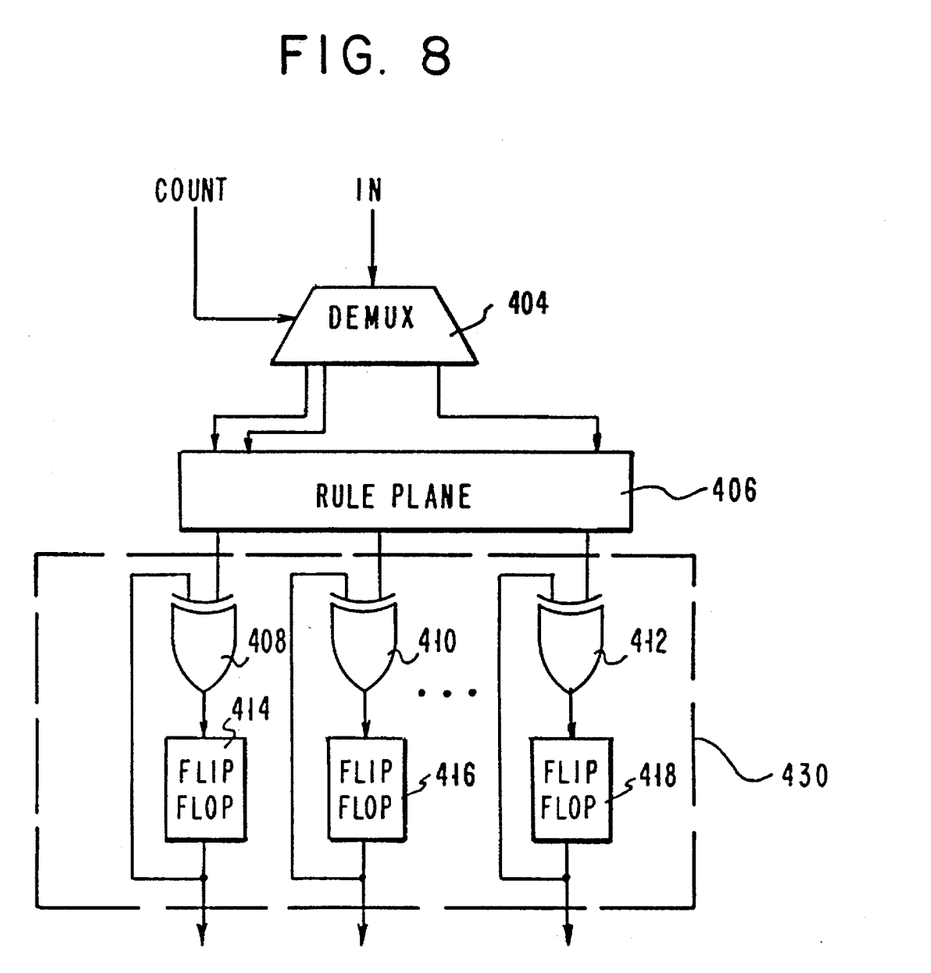
FIG. 8 is a block diagram of error checking and correcting apparatus suitable for use in the portion of the parallel processor system shown in FIG. 7.
Figure 9:
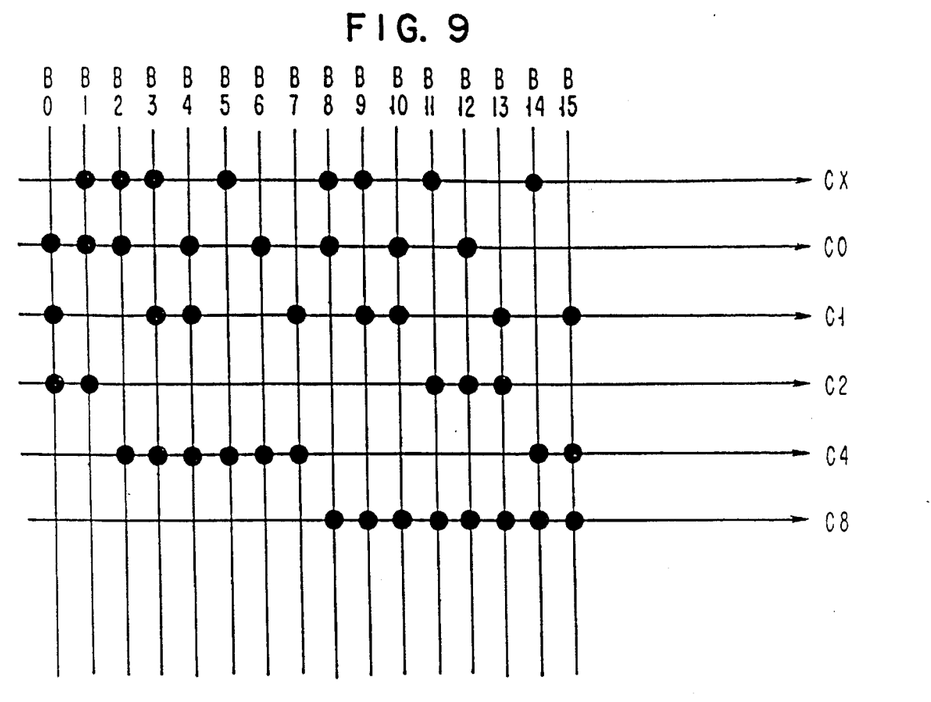
FIG. 9 is connection diagram for a rule plane which corresponds to the exemplary algorithm presented in the text for generating an error correction code.

In FIG. 8, a circuit is shown for the generation and analysis of error correction codes. A demultiplexer 404 (also represented as a state decoder) distributes incoming data from the host to a proper column of a rule plane 406. A rule plane 406 directs the data from the column to the appropriate row according to the algorithm set forth by rule R. In a preferred embodiment of the invention, the rule plane consists of fixed pattern of interconnections which are used to connect selected rows to selected columns. An example of a rule plane which is used to implement the algorithm of Table 1 is shown in FIG. 9. EXCLUSIVE-OR gates 408, 410 and 412 are used for performing the EXCLUSIVE-OR function in relationship to rule R. A state recorder 430 is used for calculating and maintaining intermediate data in relationship to rule R. The state recorder 430 will clock appropriate flip-flops 414, 416 and 418 in a pre-determined order to execute the algorithm specified by rule R. After the state recorder 430 has provided 16 clock signals the flip-flops 414, 416 and 418 contain the bits which constitute the error correction code. This error correction code is stored in a portion of memory adjacent to the $N^2$ by K-bit buffer 308.

The ECC checking is the counterpart of the ECC generation. ECC checking is performed when (1) reading the buffer from the SIMD side, and (2) reading the buffer from the host side. A read operation from the SIMD system will read out both the data bits and the code bits generated according to R. Since the data and the code bits are available simultaneously, at the input port to the SIMD system, this ECC checking can be implemented by using a commercial ECC part (e.g. AMD2960/AMD2960A).

Figure 10:
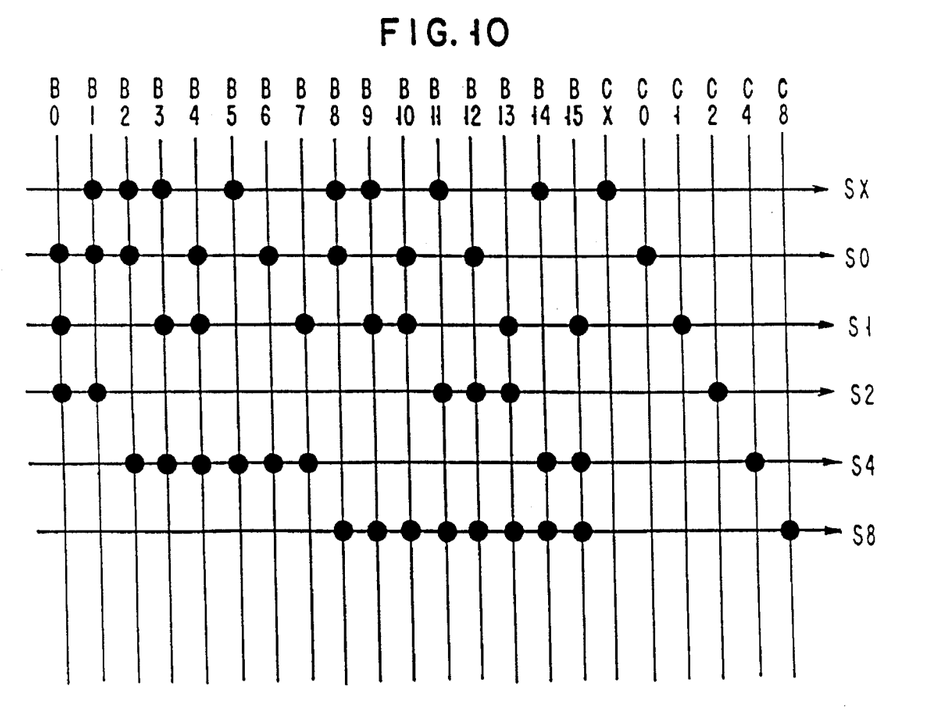
FIG. 10 is a connection diagram for a rule plane which corresponds to the exemplary algorithm presented in the text for using an error correction code for purposes of error detection.

Error correction code checking at the host side may be performed by using a circuit which is similar to that illustrated in FIG. 8. However, the rule plane of FIG. 10 is substituted for the rule plane of FIG. 9. Error correction code checking is accomplished by using a set of six syndrome bits (SX,S0,S1,S2,S4,S8). Syndrome bits may be generated in

TABLE 1

| Generated Check Bits | Parity | Participating Data Bits | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| CX | Even (XOR) | | X | X | X | | X | | | X | X | | X | | | X | |
| C0 | Even (XOR) | | X | X | X | | X | | X | | X | | X | | X | | |
| C1 | Odd (XNOR) | X | | | X | X | | | X | | X | X | | | X | X | |
| C2 | Odd (XNOR) | X | X | | | | X | X | X | | | | X | X | X | | |
| C4 | Even (XOR) | | | X | X | X | X | X | X | | | | | | | X | X |
| C5 | Even (XOR) | | | | | | | | | X | X | X | X | X | X | X | X |

The Error Correction Code (ECC) for the buffer can be generated in two ways: one is related to writing the buffer from the host side, and the other is related to writing the buffer from the SIMD side. In both cases the same rule R is applied to generate the code bits. These generated code bits the state recorder of FIG. 8 by using the rule R' set forth below. An example for one of W words of length 16 bits follows:

SX=B1 xor B2 xor B3 xor B5 xor B8 xor B9 xor B11 xor B14 xor CX

S0=B0 xor B1 xor B2 xor B4 xor B6 xor B8 xor B10 xor B12 xor C0

S1=B0 xor B3 xor B4 xor B7 xor B9 xor B10 xor B13 xor B15 xor C1

S2=B0 xor B1 xor B5 xor B6 xor B7 xor B11 xor B12 xor B13 xor C2

S4=B2 xor B3 xor B4 xor B5 xor B6 xor B7 xor B14 xor B15 xor C4

S8=B8 xor B9 xor B10 xor B11 xor B12 xor B13 xor B14 xor B15 xor C8

Syndrome bit generation differs from error correction code bit generation in that syndrome bits are a function of the error correction code bits.

By using syndrome bits in conjunction with Table 2, it is possible to determine, not only whether a single-bit error has occurred, but also the bit location of this error and if certain multiple-bit errors have occurred.

TABLE 2

| Syndrome Bits | | | S8 | 0 | 1 | 0 | 1 | 0 | 1 | 0 | 1 |
|---|---|---|---|---|---|---|---|---|---|---|---|
| | | | S4 | 0 | 0 | 1 | 1 | 0 | 0 | 1 | 1 |
| SX | S0 | S1 | S2 | 0 | 0 | 0 | 0 | 1 | 1 | 1 | 1 |
| 0 | 0 | 0 | | * | C8 | C4 | T | C2 | T | T | M |
| 0 | 0 | 1 | | C1 | T | T | 15 | T | 13 | 7 | T |
| 0 | 1 | 0 | | C0 | T | T | M | T | 12 | 6 | T |
| 0 | 1 | 1 | | T | 10 | 4 | T | 0 | T | T | M |
| 1 | 0 | 0 | | CX | T | T | 14 | T | 11 | 5 | T |
| 1 | 0 | 1 | | T | 9 | 3 | T | M | T | T | M |
| 1 | 1 | 0 | | T | 8 | 2 | T | 1 | T | T | M |
| 1 | 1 | 1 | | M | T | T | M | T | M | M | T |

\* → no errors detected
Number → location of the single bit-in-error
T → two errors detected
M → three or more errors detected While the invention has been described in terms of an exemplary embodiment, it is contemplated that it may be practiced as outlined above with modifications within the spirit and scope of the appended claims.

The invention claimed is:

1. A method of restricting a plurality of memory accesses by a first plurality of simultaneously executed identical computer program instructions corresponding to a first computer program instruction and a second plurality of simultaneously executed identical computer program instructions corresponding to a second computer program instruction in a Single Instruction Multiple Data (SIMD) computer which includes a plurality of processing elements wherein each processing element is associated with a respective partition of a memory, said memory addressed by a plurality of memory addresses, wherein said memory is comprised of a plurality of memory planes, each of said memory planes;
  a) having a respective corresponding address space relative to each other and
  b) corresponding to a respective portion of said plurality of memory addresses, each of said partitions being comprised of respective portions of said plurality of memory planes, and further including a table containing;
  a) ones of said plurality of memory addresses which indicate allowed memory access and
  b) a plurality of references to each of a plurality of simultaneously existing bit planes, said method comprising the steps of:
  a) analyzing the first and the second computer program instructions to determine whether the first and the second plurality of simultaneously executed identical computer program instructions will access the memory associated with the SIMD computer at respective first and second addresses of said plurality of memory addresses in the memory which the respective first and second plurality of simultaneously executed identical computer program instructions will use;
  b) evaluating said ones of said plurality of memory addresses in said table to determine if memory access is allowed at least at one of the first and second addresses of said plurality of memory addresses for any of the plurality of processors;
  c) evaluating at least one of a plurality of simultaneously existing bit planes referenced by said plurality of references in said table to determine if any memory access is allowed at least at one of the first and second addresses of said plurality of memory addresses for any of the plurality of processors;
  d) selectively inhibiting the execution of at least one of said first and second plurality of simultaneously executed identical computer program instructions based upon the determination of both step b) and step c).

2. The method of claim 1, wherein the plurality of bit planes are stored in said memory.

3. The method of claim 1, wherein said bit planes are selected ones of said memory planes.

4. The method of claim 1, wherein said bit planes isolate areas of said memory planes.

5. The method of claim 4, wherein said bit planes isolate areas of said memory planes on a per process basis.

6. A method of restricting a plurality of memory accesses by a first plurality of simultaneously executed identical computer program instructions corresponding to a first computer program instruction and a second plurality of simultaneously executed identical computer program instructions corresponding to a second computer program instruction in a Single Instruction Multiple Data (SIMD) computer including a plurality of memories, said memories addressed by a plurality of memory addresses, wherein said memories are comprised of a plurality of memory planes, each of said memory planes;
  a) having a respective corresponding address space relative to each other and
  b) corresponding to a portion of said plurality of memory addresses, and further including a table containing;
  a) ones of said plurality of memory addresses for data in the plurality of memories, and respective permission read bits and permission write bits which indicate, for the respective addresses, whether read operations and write operations, respectively, are allowed, and
  b) a plurality of references to each of a plurality of simultaneously existing bit planes, said method comprising the steps of:
  a) analyzing the first and the second computer program instruction to determine whether the first and the second plurality of simultaneously executed identical computer program instructions will read data from or write data to the plurality of memories and what respective first and second addresses of said plurality of memory addresses the first and second plurality of simultaneously executed identical computer program instructions respectively will use;

b) evaluating said ones of said plurality of memory addresses in said table to determine if any access to the plurality of memories is allowed at least at one of the first and second addresses of said plurality of memory addresses;

c) evaluating the permission read bits, if the first and second plurality of simultaneously executed identical computer program instructions performs a plurality memory read operations, to determine if said plurality of memory read operations are allowed at the first and second addresses of said plurality of memory addresses;

d) evaluating the permission write bits, if the first and second plurality of simultaneously executed identical computer program instructions performs a plurality of memory write operations, to determine if said plurality of memory operations are allowed at the first and second addresses of said plurality of memory addresses;

e) evaluating at least one of a plurality of simultaneously existing bit planes referenced by said plurality of references in said table to determine if any memory access is allowed at the first and second addresses of said plurality of memory addresses;

f) selectively inhibiting the execution of the plurality of simultaneously executed identical computer program instructions based upon the results of steps b), c), d) and e).

7. The method of claim 6, wherein at least two of the steps a)–d) are performed concurrently.

8. The method of claim 7, wherein a table is maintained for a plurality of computer program instructions which constitute a process, and separate tables are maintained for a plurality of processes, further comprising the step of selecting the table to use based on the process being executed by the SIMD.

9. The method of claim 8, wherein a plurality of tables are stored in a first memory of the SIMD computer, and each of said plurality of tables corresponds to a process which is running on the SIMD computer, said method further comprising the step of transferring one of said plurality of tables from the first memory to a second memory of the SIMD computer for performing the steps b), c) and d).

10. The method of claim 9 wherein the table includes a plurality of protective memory plane addresses, representing respective memory locations within a memory plane of the SIMD system and said method further comprises the step of:

d1) if the memory operation is allowed by step d) evaluating at least one of said plurality of protective memory plane addresses to determine whether the memory operation is allowed.

11. The method of claim 6, wherein the plurality of bit planes are stored in said memory.

12. The method of claim 6, wherein said bit planes are selected ones of said memory planes.

13. The method of claim 6, wherein said bit planes isolate areas of said memory planes.

14. The method of claim 13, wherein said bit planes isolate areas of said memory planes on a per process basis.

15. A Single Instruction Multiple Data (SIMD) computer for executing a first plurality of simultaneously executed identical computer program instructions corresponding to a first computer program instruction and a second plurality of simultaneously executed identical computer program instructions corresponding to a second computer program instruction, said SIMD computer comprising:

a plurality of processing elements for executing said first plurality of simultaneously executed identical computer program instructions during a first time interval and for executing said second plurality of simultaneously executed identical computer program instructions during a second time interval;

a memory addressed by a plurality of memory addresses, said memory comprised of a plurality of memory planes, each of said memory planes;
  a) having a respective corresponding address space relative to each other and
  b) corresponding to a respective portion of said plurality of memory addresses, wherein each processing element of said plurality of processing elements is associated with a respective partition of said memory, each of said partitions being comprised of respective portions of said plurality of said memory planes;

means for analyzing the first and second computer program instructions to determine whether the first and the second plurality of simultaneously executed identical computer program instructions will access the memory at respective first and second addresses of said plurality of memory addresses in the memory which the respective first and second plurality of simultaneously executed identical computer program instructions will use;

said memory including a table containing
  a) ones of said plurality of memory addresses which indicate allowed memory access and
  b) a plurality of references to each of a plurality of simultaneously existing bit planes;

a plurality of simultaneously existing bit planes which indicate if memory access is allowed at least at one of the first and the second addresses of said plurality of memory addresses for any of the plurality of processors; and means for evaluating said ones of said plurality of memory addresses in said table and said plurality of simultaneously existing bit planes referenced by said plurality of references in said table to determine if the execution of at least one of said first and second plurality of simultaneously executed identical computer program instruction should be inhibited.

16. The SIMD computer of claim 15, wherein said bit planes are selected ones of said memory planes.

17. The SIMD computer of claim 15, wherein said bit planes isolate areas of said memory planes.

18. The SIMD computer of claim 17, wherein said bit planes isolate areas of said memory planes on a per process basis.

* * * * *